United States Patent
Corrao et al.

(10) Patent No.: US 9,055,018 B2
(45) Date of Patent: Jun. 9, 2015

(54) RELATED MESSAGE DETECTION AND INDICATION

(75) Inventors: Ann M. Corrao, Raleigh, NC (US); Brian M. O'Connell, Research Triangle Park, NC (US); Brian J. Snitzer, Lancaster, PA (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 559 days.

(21) Appl. No.: 12/959,639

(22) Filed: Dec. 3, 2010

(65) Prior Publication Data

US 2012/0143960 A1    Jun. 7, 2012

(51) Int. Cl.
*G06F 15/16* (2006.01)
*H04L 12/58* (2006.01)
*G06F 12/00* (2006.01)

(52) U.S. Cl.
CPC ...................................... *H04L 51/16* (2013.01)

(58) Field of Classification Search
USPC .......................... 709/206–207, 223–229, 250
See application file for complete search history.

(56) References Cited

U.S. PATENT DOCUMENTS

| | | | |
|---|---|---|---|
| 7,072,942 B1 | 7/2006 | Maller | |
| 7,421,690 B2 | 9/2008 | Forstall et al. | |
| 7,552,178 B2 | 6/2009 | Chen et al. | |
| 7,882,184 B1 * | 2/2011 | Wu | 709/206 |
| 2003/0233353 A1 * | 12/2003 | Taylor | 707/3 |
| 2004/0260756 A1 * | 12/2004 | Forstall et al. | 709/200 |
| 2005/0144241 A1 * | 6/2005 | Stata et al. | 709/206 |
| 2005/0153688 A1 * | 7/2005 | Burkhart et al. | 455/414.3 |
| 2006/0041626 A1 * | 2/2006 | Chen et al. | 709/206 |
| 2006/0190572 A1 | 8/2006 | Novik et al. | |
| 2006/0259551 A1 * | 11/2006 | Caldwell | 709/204 |
| 2007/0106729 A1 * | 5/2007 | Adams et al. | 709/206 |
| 2008/0162652 A1 * | 7/2008 | True et al. | 709/206 |
| 2008/0168147 A1 * | 7/2008 | Malik | 709/206 |
| 2008/0243631 A1 * | 10/2008 | Kane et al. | 705/26 |
| 2008/0250112 A1 * | 10/2008 | Chen et al. | 709/206 |
| 2008/0275957 A1 * | 11/2008 | Pouzin et al. | 709/206 |
| 2009/0204681 A1 | 8/2009 | Sun | |
| 2011/0314384 A1 * | 12/2011 | Lindgren et al. | 715/739 |

FOREIGN PATENT DOCUMENTS

| | | |
|---|---|---|
| EP | 1942450 A1 | 9/2008 |
| WO | WO 0175559 A2 * | 10/2001 |

* cited by examiner

*Primary Examiner* — Zarni Maung
(74) *Attorney, Agent, or Firm* — Yee & Associates, P.C.; Lisa J. Ulrich

(57) ABSTRACT

A method, a computer program product, and a computer system for managing requests to send messages are presented. Header information associated with a set of incoming messages on a server data processing system is retrieved in response to receiving a request to send a drafted message from a client data processing system to the server data processing system. The header information is searched to determine whether an incoming message in the set of incoming messages is related to the drafted message. An indication that the incoming message is related to the drafted message is presented at the client data processing system in response to determining that the incoming message is related to the drafted message.

18 Claims, 6 Drawing Sheets

RELATED MESSAGE DETECTION AND INDICATION

BACKGROUND

1. Field

The disclosure relates generally to message transfer among data processing systems and more specifically to policies for sending and receiving messages at a data processing system.

2. Description of the Related Art

The Internet is a global network of computers and networks joined together by gateways that handle data transfer and the conversion of messages from a protocol of a sending network to a protocol used by a receiving network. On the Internet, computers may communicate with other computers. Information between computers travels over the Internet through a variety of languages also referred to as protocols. A set of protocols used on the Internet is called the Transmission Control Protocol/Internet Protocol (TCP/IP).

Electronic mail (e-mail) is widely used to communicate over the Internet. It is commonplace for users to send messages to others users through the Internet in the form of electronic mail. The use of electronic mail is commonplace for personal and business use. Electronic mail is used by individuals to keep in touch with and communicate with other users. Additionally, electronic mail provides a medium to collaborate and exchange documents.

The messages may be drafted using an electronic mail program on a computer. While a user is drafting a message, the message is generally not available to be accessed by other computers. In other words, the message may be considered to be off-line. When the user desires to send the message, the electronic mail program can transfer the message from the computer the message was drafted at to an intermediate computer, such as a server computer for example. From the server computer, the message may be retrieved by an electronic mail program of the intended recipient of the message.

The process of transferring messages to and from a server computer may be referred to as replication. The message drafted at the user's computer is replicated to the server computer. The message may then be later replicated by an electronic mail program at the recipient's computer.

SUMMARY

The different illustrative embodiments provide a method for managing requests to send messages. In an illustrative embodiment, header information associated with a set of incoming messages on a server data processing system is retrieved in response to receiving a request to send a drafted message from a client data processing system to the server data processing system. The header information is searched to determine whether an incoming message in the set of incoming messages is related to the drafted message. An indication that the incoming message is related to the drafted message is presented at the client data processing system in response to determining that the incoming message is related to the drafted message.

The different illustrative embodiments further provide a computer program product for managing requests to send messages. The computer program product comprises one or more computer-readable, tangible storage devices. Program instructions, stored on at least one of the one or more storage devices, retrieve header information associated with a set of incoming messages on a server data processing system in response to receiving a request to send a drafted message from a client data processing system to the server data processing system. Program instructions, stored on at least one of the one or more storage devices, search the header information to determine whether an incoming message in the set of incoming messages is related to the drafted message. Additionally, program instructions, stored on at least one of the one or more storage devices, indicate at the client data processing system that the incoming message is related to the drafted message in response to determining that the incoming message is related to the drafted message.

The different illustrative embodiments further provide a computer system for managing requests to send messages. The computer system comprises one or more processors, one or more computer-readable memories and one or more computer-readable, tangible storage devices. Program instructions, stored on at least one of the one or more storage devices for execution by at least one of the one or more processors via at least one of the one or more memories, retrieve header information associated with a set of incoming messages on a server data processing system in response to receiving a request to send a drafted message from a client data processing system to the server data processing system. Program instructions, stored on at least one of the one or more storage devices for execution by at least one of the one or more processors via at least one of the one or more memories, search the header information to determine whether an incoming message in the set of incoming messages is related to the drafted message. Additionally, program instructions, stored on at least one of the one or more storage devices for execution by at least one of the one or more processors via at least one of the one or more memories, indicate at the client data processing system that the incoming message is related to the drafted message in response to determining that the incoming message is related to the drafted message.

DETAILED DESCRIPTION

Figure 1:
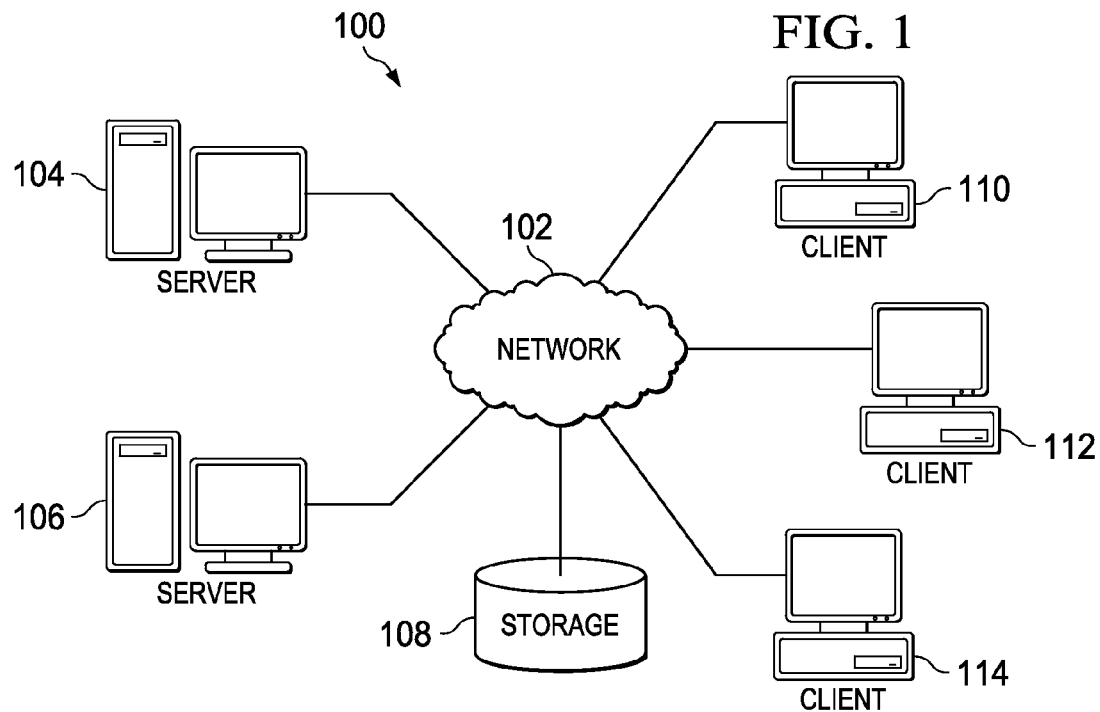
FIG. 1 depicts a pictorial representation of a network of data processing systems in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable storage devices may be utilized. A computer readable data storage device may be, for example, but not limited to an electronic, magnetic, optical, or semiconductor system, apparatus, device. More specific examples (a non-exhaustive list) of the computer-readable data storage device would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, a magnetic storage device, or any suitable combination of the foregoing. In the context of this document, a computer readable data storage device may be any tangible medium that can store a program for use by or in connection with an instruction execution system, apparatus, or device. The term "computer-readable storage device does not include a signal propagation media such as a copper cable, optical fiber or wireless transmission media.

Computer program code for carrying out operations of the present invention may be written in any combination of one or more programming languages, including an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

With reference now to the figures and, in particular, with reference to FIG. 1, an illustrative diagram of a data processing environment is provided in which illustrative embodiments may be implemented. It should be appreciated that FIG. 1 is only provided as an illustration of one implementation and is not intended to imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers 110, 112, and 114 connect to network 102. Client computers 110, 112, and 114 may be, for example, personal computers or network computers. In the depicted example, server computer 104 provides information, such as boot files, operating system images, and applications to client computers 110, 112, and 114. Client computers 110, 112, and 114 are clients to server computer 104 in this example. Network data processing system 100 may include additional server computers, client computers, and other devices not shown.

Program code located in network data processing system 100 may be stored on a computer readable storage device and downloaded to a data processing system or other device for use. For example, program code may be stored on a computer readable storage device on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol suite of protocols to communicate with one another. At the heart of the Internet is a backbone of high-speed data communication lines between major nodes or host computers consisting of thousands of commercial, governmental, educational and other computer systems that route data and messages.

In these illustrative examples, client computer 110 may be a client data processing system that can send and receive messages, such as electronic mail messages, for example. The program code for use on client computer 110 may be an electronic mail program for sending and receiving messages. Additionally, server computer 104 may be a server data processing system for transferring electronic mail in network 102. Server computer 104 may include agents for transferring messages among client computers 110, 112, and 114.

Electronic mail programs, such as electronic mail client program 114 and electronic mail server program 116, may employ different protocols depending upon the implementation. For example, simple mail transfer protocol (SMTP) is a standard electronic mail protocol that is based on Transmission Control Protocol/Internet Protocol. This protocol defines a format for the message and the agent that stores and transfers the message. Other protocols, such as for example, without limitation, post office protocol (POP), internet message access protocol (IMAP), also may be employed to retrieve messages.

Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

Figure 2:
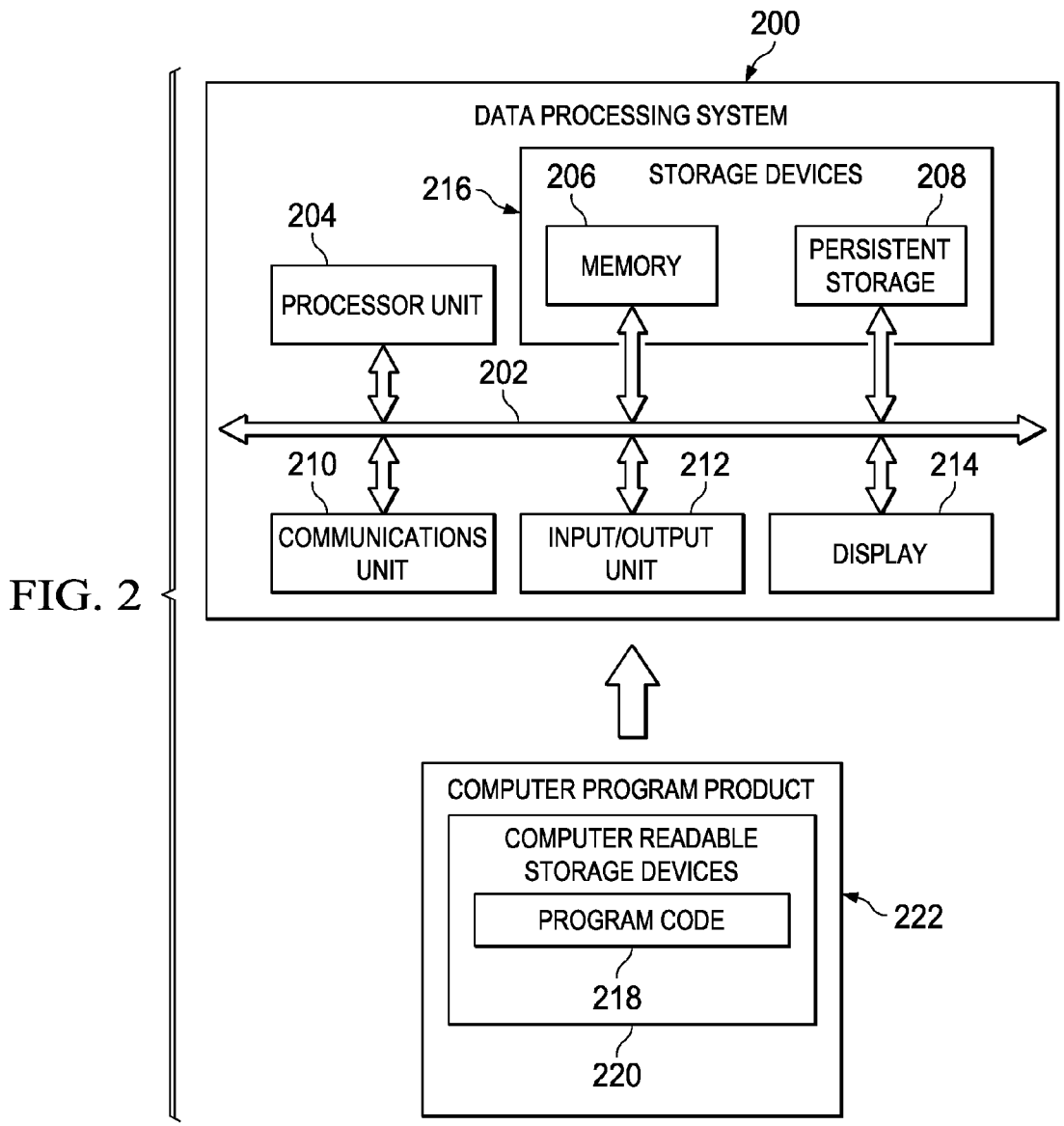
FIG. 2 is an illustration of a block diagram of a data processing system depicted in accordance with an illustrative embodiment.

Turning now to FIG. 2, a block diagram of a data processing system is depicted in accordance with an illustrative embodiment. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device.

Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for an operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, program instructions, or computer readable program instructions that may be read and run by processor unit 204. The program code in the different embodiments may be embodied on different physical or tangible computer readable media, such as memory 206 or persistent storage 208.

Program code 218 is located in a functional form on computer readable storage devices 220 that are selectively removable and may be loaded onto or transferred to data processing system 200 for running by processor unit 204. Program code 218 and computer readable storage devices 220 form computer program product 222 in these examples. Computer readable storage devices 220 may include, for example, an optical or magnetic disk that is inserted or placed into a drive or other device that is part of persistent storage 208 for transfer onto a storage device, such as a hard drive, that is part of persistent storage 208. Computer readable storage devices 220 also may take the form of a persistent storage, such as a hard drive, a thumb drive, or a flash memory, that is connected to data processing system 200. In some instances, computer readable storage devices 220 may not be removable from data processing system 200.

In some illustrative embodiments, program code 218 may be downloaded over a network to persistent storage 208 from another device or data processing system via communications unit 210 for use within data processing system 200. For instance, program code stored in a computer readable storage device in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 204 may take the form of a hardware unit that has circuits that are manufactured or configured for a particular use. This type of hardware may perform operations without needing program code to be loaded into a memory from a storage device to be configured to perform the operations.

For example, when processor unit 204 takes the form of a hardware unit, processor unit 204 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 218 may be omitted because the processes for the different embodiments are implemented in a hardware unit.

In still another illustrative example, processor unit 204 may be implemented using a combination of processors found in computers and hardware units. Processor unit 204 may have a number of hardware units and a number of processors that are configured to run program code 218. With this depicted example, some of the processes may be implemented in the number of hardware units, while other processes may be implemented in the number of processors.

As another example, a storage device in data processing system 200 is any hardware apparatus that may store data. Memory 206, persistent storage 208, and computer readable storage devices 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache, such as found in an interface and memory controller hub that may be present in communications fabric 202.

In the course of developing the invention, the inventors discovered that, often times, there are lapses of time during the electronic mail message replication process. For example, replicating a message to a server computer may take a certain amount of time. In another example, an electronic mail program of a recipient may only retrieve messages at predetermined intervals of time. The predetermined intervals of time may be selected to reduce an amount of traffic on the networks and gateways connecting the recipient's computer to the server computer. Thus, a delay of time can occur between sending the message and the message being received.

The different illustrative embodiments recognize and take into account a number of different considerations. For example, the different illustrative embodiments recognize that there may be a delay of time between when a message is sent and when the message is received. A certain amount of time may be required for messages to be sent to a server. There may also be lapses of time between when messages arrive at the server until an electronic mail program retrieves the messages from the server.

Depending on several factors, time for messages to be sent from a sender's computer to being available at a recipient's computer may be longer than desired. For example, without limitation, the factors may include the size of the messages, the number of attachments, the number of messages, the speed of the network connection, and/or an amount of traffic on the network. Additionally, electronic mail programs may only retrieve messages at predetermined intervals.

The different illustrative embodiments further recognize and take into account that by the time a user replies to a message, others may have replied to the same message. This situation may be a result of the time it takes to draft a message and/or due to the delay of time. The different illustrative embodiments further recognize and take into account that inconsistencies may be present in a series of messages. For example, the user may be replying to an answer to a question that has already been answered. Thus, the reply may be redundant. In other examples, the reply may be incomplete or no longer relevant based on messages already sent but not yet received by the user.

Thus, the different illustrative embodiments provide a method, a computer program product, and a computer system for managing requests to send messages. In an illustrative embodiment, header information associated with a set of incoming messages on a server data processing system is retrieved in response to receiving a request to send a drafted message from a client data processing system to the server data processing system. The header information is searched to determine whether an incoming message in the set of incoming messages is related to the drafted message. An indication that the incoming message is related to the drafted message is presented at the client data processing system in response to determining that the incoming message is related to the drafted message.

As used herein, a set when referring to items means one or more items. Also as used herein, a first component may be considered to be associated with a second component by being secured to the second component, bonded to the second component, fastened to the second component, and/or connected to the second component in some other suitable manner. The first component also may be connected to the second component through using a third component. The first component may also be considered to be associated with the second component by being formed as part of and/or an extension of the second component.

Figure 3:
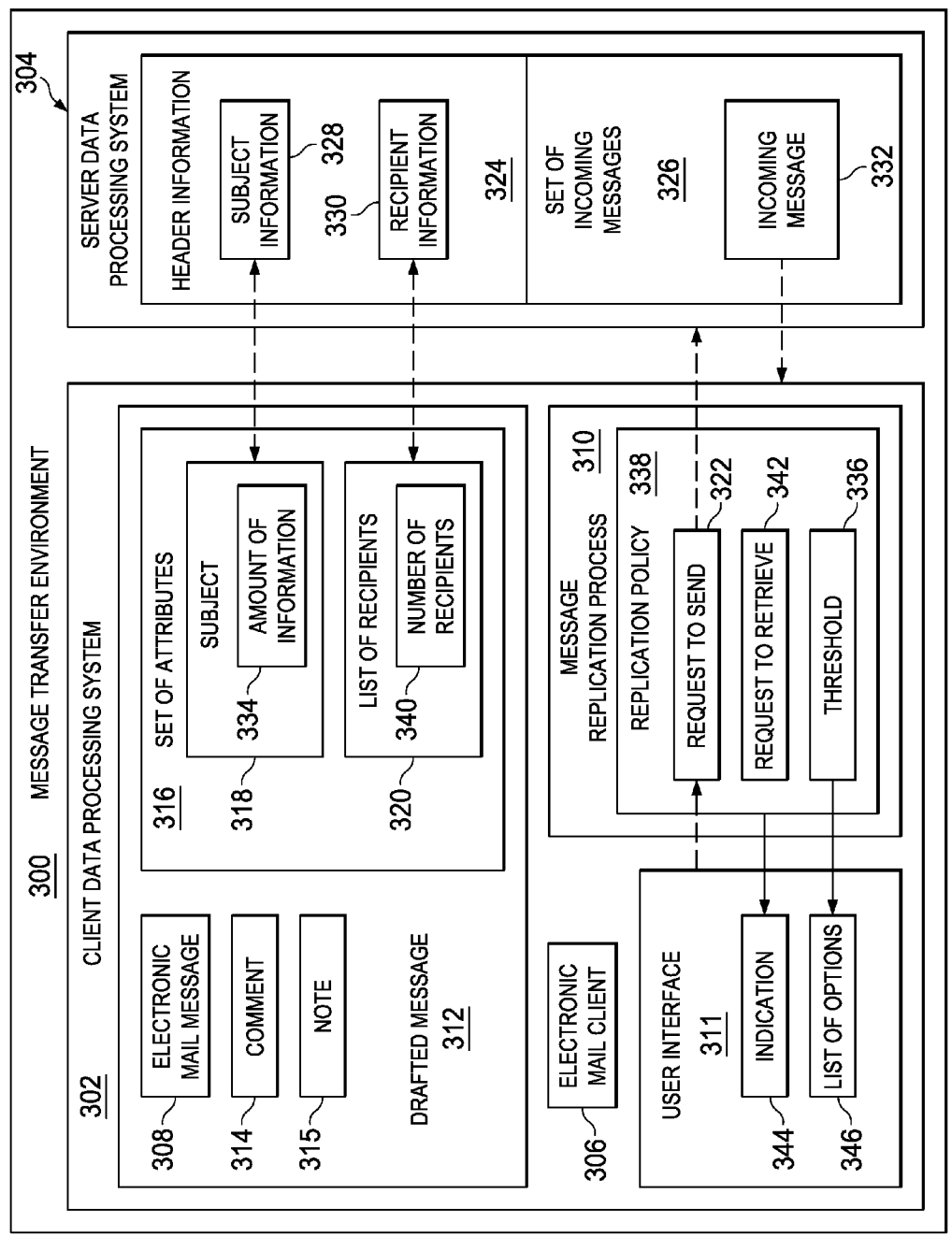
FIG. 3 is an illustration of a block diagram of a message transfer environment depicted in accordance with an illustrative embodiment.

With reference now to FIG. 3, an illustration of a block diagram of a message transfer environment is depicted in accordance with an illustrative embodiment. Message transfer environment 300 is an environment in which illustrative embodiments may be implemented. In these illustrative embodiments, message transfer environment 300 may be implemented in a network such as network 102 in FIG. 1.

Message transfer environment 300 includes client data processing system 302 and server data processing system 304. In these illustrative examples, client data processing system 302 is an example of one implementation of client computer 110 in FIG. 1. Client data processing system 302 is also an example of one implementation of data processing system 200 in FIG. 2. In these examples, client data processing system 302 is any suitable device for sending and receiving data. For example, without limitation client data processing system 302 may be a mobile device, a telephone, a cell phone, a personal digital assistant, a netbook, a laptop computer, a tablet computer, and/or any other suitable computing device that can receive messages. In one example, client data processing system 302 may include electronic mail client 306. Electronic mail client 306 may send and receive electronic mail message 308. In other examples, client data processing system 302 is any device capable of sending messages to or receiving messages from server data processing system 304.

Server data processing system 304 may be any suitable computer for transferring data among other computers. Server data processing system 304 may be an example of one implementation of server computer 104 in FIG. 1. For example, client data processing system 302 may be an electronic mail server for transferring electronic mail among client devices, such as client data processing system 302, for example. Server computer 104 in FIG. 1 may be a Lotus® Domino® server commercially available from International Business Machines Corporation or a Microsoft® Exchange™ server commercially available from Microsoft Corporation. Lotus and Domino are trademarks or registered trademarks of International Business Machines Corporation in the United States, other countries, or both. Microsoft and Exchange are trademarks or registered trademarks of Microsoft Corporation in the United States, other countries, or both Client data processing system 302 includes message replication process 310. Message replication process 310 is a process configured to replicate messages in client data processing system 302. In these examples, message replication process 310 is any process that sends messages to server data processing system 304 and receives messages from server data processing system 304. For example, message replication process 310 may be an electronic mail program for sending and receiving electronic mail. Message application process 310 can be implemented by program code 218 shown in FIG. 2.

In these illustrative examples, drafted message 312 is a message drafted at client data processing system 302. Drafted message 312 may be drafted by a user of client data processing system 302 using user interface 311. In these examples, drafted message 312 is electronic mail message 308 to be sent to server data processing system 304. In other examples, drafted message 312 may be any message drafted by a user at one computer to be sent to another computer. For example, drafted message 312 may be comment 314, note 315, or other form of communication to be posted on a blog, forum, social networking site, wiki, and/or another Internet site.

Drafted message 312 includes set of attributes 316. Set of attributes 316 are items in drafted message 312 that may be used to identify drafted message 312. In this illustrative example, set of attributes 316 includes subject 318 and list of recipients 320. Subject 318 is information regarding a general topic of drafted message 312. For example, subject 318 may include information in a subject field of drafted message 312. In other examples, subject 318 may be information in the text of drafted message 312.

List of recipients 320 is a list of electronic mail addresses for intended recipients of drafted message 312. For example, list of recipients 320 may be one or more electronic mail addresses found in any of "To," "Cc," and/or "Bcc" fields of drafted message 312. In other examples, list of recipients 320 may be an internet protocol address of server data processing system 304, or a uniform resource locator (URL) of an address of for a website.

In these illustrative examples, message replication process 310 may receive request to send 322 drafted message 312. In these examples, request to send 322 is any command received to replicate or otherwise make drafted message 312 available on-line. The user drafting drafted message 312 may provide request to send 322 using user interface 311. For example, request to send 322 may be a user selection of a "send" command in an electronic mail program. Request to send 322 may also be a post, share, and/or any other suitable command indication that the user desires for drafted message 312 to be sent to server data processing system 304.

Prior to sending drafted message 312 to server data processing system 304, message replication process 310 may search for information on server data processing system 304. For example, message replication process 310 may search header information 324 at server data processing system 304. In these examples, header information 324 is information regarding set of incoming messages 326 at server data processing system 304. For example, header information 324 may include subject information 328 and recipient information 330. Subject information 328 is information regarding the subject of messages in set of incoming messages 326. Recipient information 330 includes intended destinations for messages in set of incoming messages 326. For example, recipient information 330 may include one or more electronic mail addresses of intended recipients of messages in set of incoming messages 326.

Message replication process 310 searches header information 324 to determine whether any messages in set of incoming messages 326 are related to drafted message 312. In these illustrative examples, messages related to drafted message 312 are any messages that may cause the user to desire to change drafted message 312 prior to drafted message 312 being sent. For example, incoming message 332 may contain information concerning text in the body of drafted message 312. Incoming message 332 may have a subject that is the same as subject 318 of drafted message 312. In other examples, incoming message 332 may be sent to a list of recipients that is similar to list of recipients 320 of drafted message 312. In other examples, incoming message 332 may have a message thread identifier in header information that is same as a message thread identifier in header information of the drafted message 312.

In these illustrative examples, message replication process 310 may compare subject 318 with subject information 328 to determine whether drafted message 312 is related to any messages in set of incoming messages 326. For example, message replication process 310 may determine whether the text in subject 318 is the same as the text in subject information 328 for any messages in set of incoming messages 326. If the text in subject 318 is the same as the text of the subject of incoming message 332, message replication process 310 will determine that incoming message 332 is related to drafted message 312. In comparing, message replication process 310 may disregard a prefix of subject 318 and/or a prefix in subject information 328. For example, message replication process 310 may disregard prefixes such as "Re:" "Fw:" and/or any other prefixes.

In another illustrative example, message replication process 310 may use methods or processes to determine whether drafted message 312 is related to any messages in set of incoming messages 326. For example, message replication process 310 may determine amount of information 334 in subject 318 that is the same as subject information 328 for incoming message 332. Amount of information 334 may be any number of characters that are the same as characters in subject information 328 for incoming message 332. Amount of information 334 may also be a number of operations that need to be performed on subject 318 so that subject 318 matches subject information 328 for incoming message 332.

If amount of information 334 meets threshold 336, message replication process 310 may determine that drafted message 312 is related to incoming message 332. Threshold 336 may be a value in replication policy 338 for client data processing system 302. The value for threshold 336 may take a number of different forms. For example, the value for threshold 336 may be a percentage, an integer, or some other suitable value. Threshold 336 may be set based on data regarding relationships between messages. For example, threshold 336 may be a minimum number of characters that can be different between subjects for the messages to be related. In other examples, threshold 336 may be a percentage of a total number of characters in subject 318 or subject information 328. Threshold 336 may be selected by a user of client data processing system 302. Threshold 336 may be identified or set ahead of time before replication process 310 is started. In other examples, threshold 336 may be identified or changed while replication process 310 runs.

In these illustrative examples, replication policy 338 includes a set of rules for determining when to transmit messages from and retrieve messages into client data processing system 302. Replication policy 338 may also include information, such as thresholds, parameters, and other values that are used in applying the set of rules.

In addition to or as an alternative, message replication process 310 may also consider list of recipients 320 in determining whether drafted message 312 is related to any messages in set of incoming messages 326. For example, message replication process 310 may determine number of recipients 340 that are the same as recipients in recipient information 330 for incoming message 332. If number of recipients 340 meets threshold 336, message replication process 310 may determine that drafted message 312 is related to incoming message 332.

Message replication process 310 may improve the accuracy of determinations that use list of recipients 320 to determine whether drafted message 312 is related to any messages in set of incoming messages 326. For example, message replication process 310 may require exact matches between list of recipients 320 and recipient information 330 for incoming message 332. In other examples, a certain number of or percentage of common recipients may be required. In yet other examples, message replication process 310 may determine that incoming message 332 is not related to drafted message 312 if the recipients in recipient information 330 for incoming message 332 is a standard group or mailing list. Users may also specify recipient addresses for message replication process 310 to disregard in determining whether drafted message 312 is related to any messages in set of incoming messages 326. In still other examples, message replication process 310 may assign less weight to recipient addresses appearing in "Cc" or "Bcc" fields than recipient addresses appearing in "To" fields. In still other examples, message replication process 310 may track user feedback of calculated relatedness and employ a Bayesian algorithm to reduce future false positives, such as if the same list of recipients appear in most messages regardless of message relationship.

In these illustrative examples, message replication process 310 may also determine whether drafted message 312 is related to messages in set of incoming messages 326 in response to receiving request to retrieve 342. Request to retrieve 342 is a request for set of incoming messages 326 to be retrieved from server data processing system 304. For example, message replication process 310 may receive request to retrieve 342 from a user of electronic mail client 306.

In other examples, request to retrieve 342 may be generated automatically according to replication policy 338. For example, request to retrieve 342 may be generated periodically. In yet illustrative other examples, request to retrieve 342 may be generated when a user logs into electronic mail client 306. Message replication process 310 may also generate request to retrieve 342 when a connection between client data processing system 302 and server data processing system 304 is established.

However, prior to retrieving set of incoming messages 326 from server data processing system 304, message replication process 310 may first search header information 324 to determine whether drafted message 312 is related to messages in set of incoming messages 326. Message replication process 310 determines whether drafted message 312 is currently being drafted. Message replication process 310 can make this determination in a number of ways. For example, message replication process 310 may detect drafted message 312 open in a window of user interface 311. Message replication process 310 may also detect user selections via user interface 311 to generate a new message or enter text into a message. In other examples, message replication process 310 may detect entry of a new message into a draft folder in electronic mail client 306.

When message replication process 310 determines that drafted message 312 is currently being drafted, message replication process 310 may determine set of attributes 316 of drafted message 312. Message replication process 310 may determine set of attributes 316 as discussed above with regard to request to send 322. Using set of attributes 316, message replication process 310 may then determine whether drafted message 312 is related to messages in set of incoming messages 326. Message replication process 310 may compare set of attributes 316 with header information 324 as discussed above with regard to request to send 322.

When message replication process 310 determines that incoming message 332 is related to drafted message 312, message replication process 310 generates indication 344 in user interface 311. Indication 344 is a notification to a user that drafted message 312 is related to a message in set of incoming messages 326. For example, message replication process 310 may display indication 344 in a window of a display in user interface 311 for electronic mail client 306.

When message replication process 310 determines that incoming message 332 is related to drafted message 312, message replication process 310 may retrieve incoming message 332 from server data processing system 304. Message replication process 310 may store incoming message 332 at client data processing system 302. In these depicted examples, message replication process 310 may retrieve incoming message 332 prior to retrieving any other message in set of incoming messages 326. Incoming message 332 is given priority because message replication process 310 determined incoming message 332 is related to drafted message 312. The user of client data processing system 302 may be able to view incoming message 332 before any other messages in set of incoming messages 326.

Message replication process 310 may also present list of options 346 in user interface 311. List of options 346 includes actions that a user may take in response to indication 344 that drafted message 312 is related to incoming message 332. For example, if a user submitted request to send 322, message replication process 310 may present the user with an option to prevent drafted message 312 from being sent. The user may modify drafted message 312 based on information in incoming message 332. The user may also decide to delete drafted message 312 without drafted message 312 being sent.

In other illustrative examples, message replication process 310 may also provide the user an option in user interface 311 to send drafted message 312 without modification as originally requested. The user may choose to disregard incoming message 332. In another example, message replication process 310 may provide an option to merge drafted message 312 with incoming message 332. For example, message replication process 310 may send drafted message 312 as a reply to incoming message 332. Message replication process 310 can include incoming message 332 in drafted message 312. Drafted message 312 can be part of a same series of messages as incoming message 332.

In these illustrative examples, message replication process 310 may reduce inconsistencies caused by delays of time in message retrieval by providing the user indication 344 and list of options 346 prior to sending drafted message 312. The user may view incoming message 332 prior to sending drafted message 312 or spending time drafting a message that is irrelevant or redundant. By searching header information 324 and giving priority to retrieving related messages, message replication process 310 reduces inconsistencies caused by delays of time in message retrieval.

The illustration of message transfer environment 300 in FIG. 3 is not meant to imply physical or architectural limitations to the manner in which different features may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, without limitation, in some illustrative embodiments, drafted message 312 may be comment 314 to be displayed on a website. Message replication process 310 may determine that newly posted comments appear on the website. Message replication process 310 may further determine that newly posted comments appear on the website within the same comment thread as the drafted message 312. Message replication process 310 may provide a user the option to modify comment 314 before comment 314 is displayed on the website.

In other illustrative embodiments, message replication process 310 may be an electronic mail program that controls the sending and receiving of messages in client data processing system 302. In still other embodiments, message replication process 310 may be an addition to replication policy 338 for electronic mail client 306. Message replication process 310 may include a list of user preferences to be implemented in replication policy 338 for electronic mail client 306.

Figure 4:
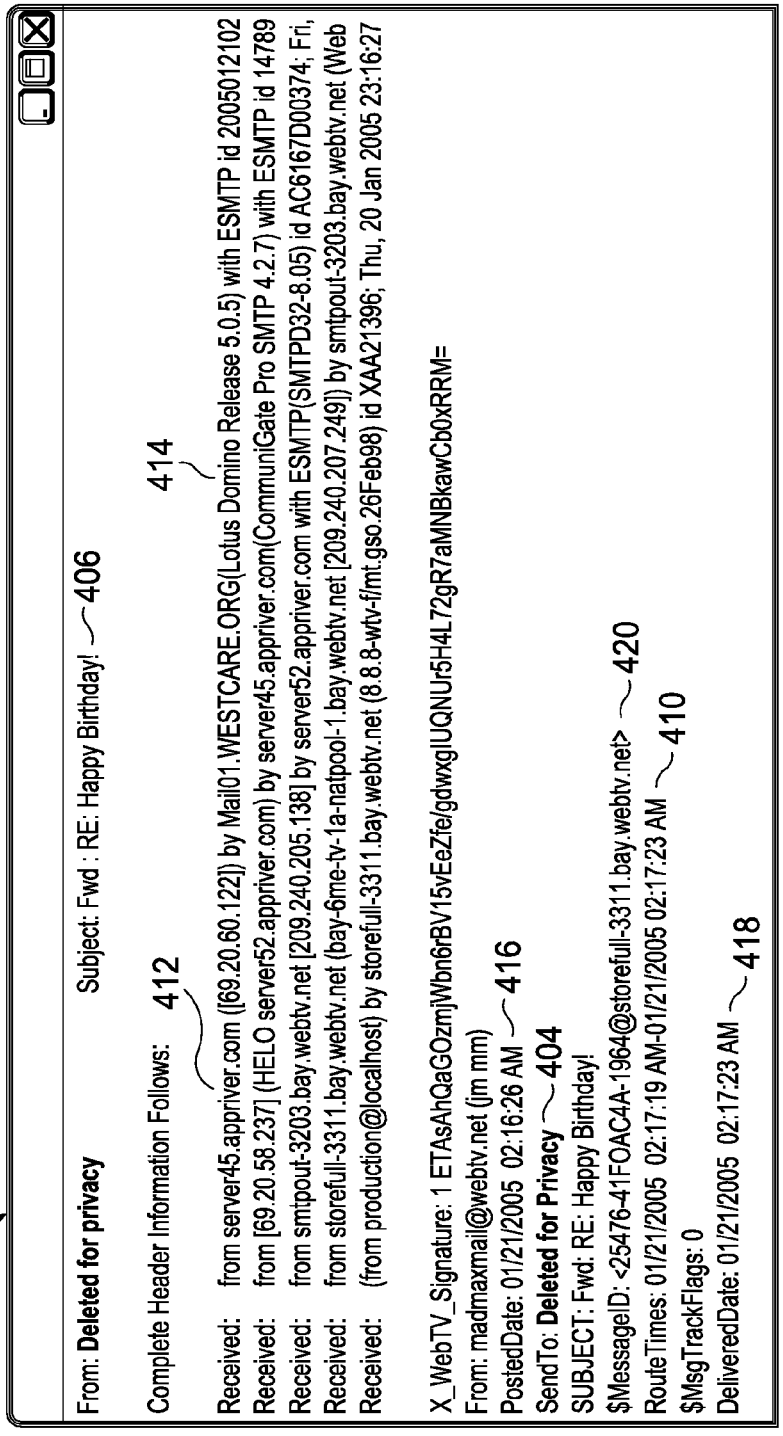
FIG. 4 is an illustration of a display of header information depicted in accordance with an illustrative embodiment.

With reference now to FIG. 4, an illustration of a display of header information is depicted in accordance with an illustrative embodiment. As depicted, display 400 includes header information 402. Header information 402 is an example of one implementation of header information 324 in FIG. 3. Display 400 presents an example of header information 402 for an electronic mail message, such as incoming message 332 in FIG. 3. Display 400 may also be a window in a user interface such as user interface 311 in FIG. 3.

In these illustrative examples, header information 402 includes list of recipients 404, subject 406, path the message traveled 408, and timestamp information 410. List of recipients 404 is a set of electronic mail addresses for intended recipients of the message. Subject 406 is text in a subject field of the message. In this example, path the message traveled 408 includes set of servers 412 and set of mail transfer agents 414. Timestamp information 410 includes times the message was sent and received by set of servers 412 and set of mail transfer agents 414. Timestamp 410 also may include time the message was sent 416 and time the message was delivered 418.

The information included in header information 402 may be searched by a replication process such as message replication process 310 in FIG. 3. The replication process may search any of list of recipients 404, subject 406, path the message traveled 408, message thread identifier 420, and timestamp information 410 to determine whether the message may be related to another message as discussed above with regard to drafted message 312 in FIG. 3.

Figure 5:
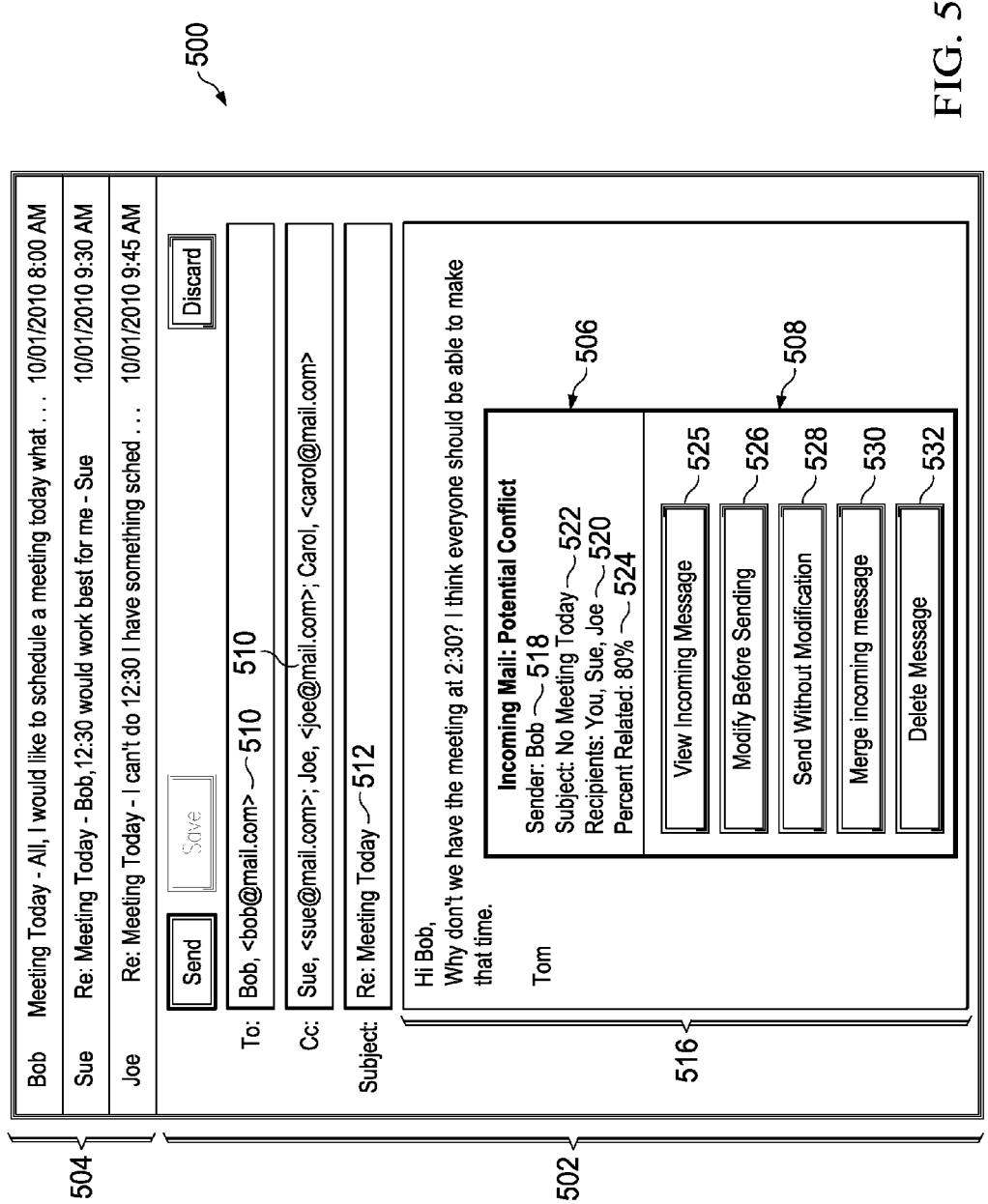
FIG. 5 is an illustration of a user interface for an electronic mail client depicted in accordance with an illustrative embodiment.

With reference now to FIG. 5, an illustration of a user interface for an electronic mail client is depicted in accordance with an illustrative embodiment. In this illustrative embodiment, user interface 500 is example of an embodiment of user interface 311 in FIG. 3. As depicted, user interface 500 includes drafted message 502, set of related messages 504, indication 506, and list of options 508. Drafted message 502, indication 506, and list of options 508 are examples of drafted message 312, indication 344, and list of options 346 of FIG. 3, respectively.

In theses illustrative embodiments, drafted message 502 includes list of recipients 510, subject 512, and body 516. List of recipients 510 and subject 512 are examples of list of recipients 320 and subject 318 of FIG. 3. A user may currently be drafting drafted message 502 using user interface 500 or may have requested that drafted message 502 be sent to list of recipients 510. Indication 506 notifies the user that drafted message 502 may be related to an incoming message. In the illustrative examples, indication 506 may also include sender 518, list of recipients 520, and subject information 522 of the incoming message. The user may be able to view the incoming message in user interface 500 by a user input, such as clicking on indication 506, for example.

In these examples, indication 506 may further provide percentage 524. Percentage 524 is indicator of the possibility that drafted message 502 is related to the incoming message. For example, percentage 524 may be determined by comparing list of recipients 510 and subject 512 of drafted message 502 with list of recipients 520 and subject information 522 of the incoming message. Percentage 524 may be determined by a replication process, such as message replication process 310 in FIG. 3, for example.

List of options 508 provides the user with actions that may be taken in response to indication 506. For example, list of options 508 are actions that the user may be able to perform with regard to drafted message, such as list of options 346 in FIG. 3. List of options 508 may include an option to view the incoming message 525, an option to modify drafted message 502 before sending 526, an option to send drafted message 502 without modification 528, an option to merge incoming message 530 with drafted message 502, and option to delete 532 drafted message 502.

The illustration of header information 402 in FIG. 4 and user interface 500 in FIG. 5 are not meant to imply physical or architectural limitations to the manner in which different features may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, without limitation, in some illustrative embodiments, header information 402 may only include list of recipients 404 and subject 406. For example, only list of recipients 404 and subject 406 may be retrieved to determine relationships. In other embodiments, header information 402 may be searched at a server before being displayed on display 400.

In some illustrative embodiments, list of options 508 may include user configurable options. For example, a user may select which options are to be displayed in list of options 508. In other examples, indication 506 and list of options 508 may not be displayed on user interface. For example, a user may select for the incoming message to be displayed automatically when the incoming message is determined to be related to drafted message 502.

Figure 6:
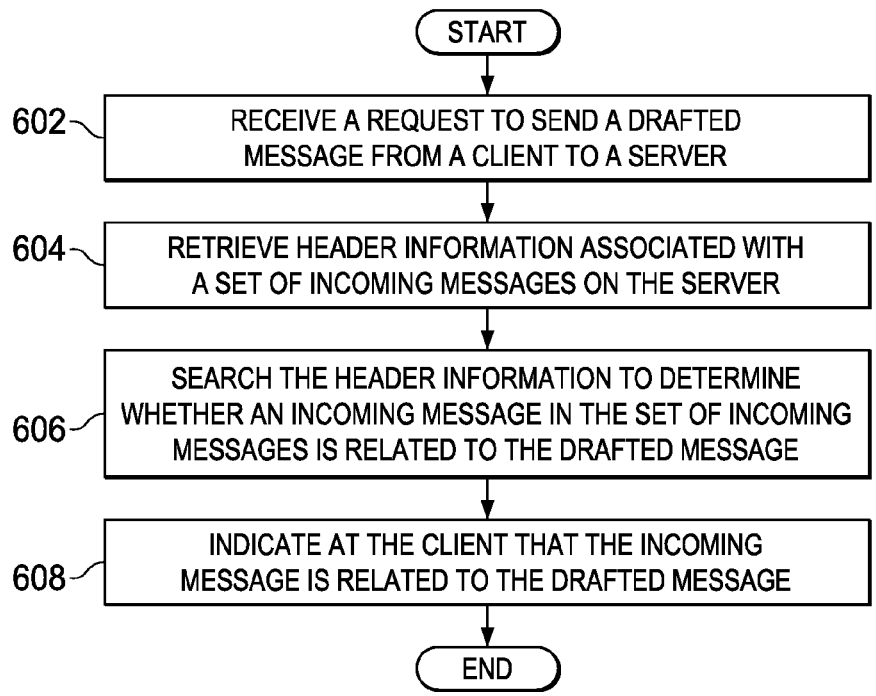
FIG. 6 is a flowchart of a process for managing requests to send messages depicted in accordance with an illustrative embodiment.

With reference now to FIG. 6, a flowchart of a process for managing requests to send messages is depicted in accordance with an illustrative embodiment. The process may be performed by message replication process 310 running on client data processing system 302 in FIG. 3.

The process begins by receiving a request to send a drafted message from a client to a server (step 602). In step 602, the client can be a client data processing system, such as client data processing system 302, for example. The client can also be a client electronic mail program. The server can be a server data proceeding system, such as server data processing system 304, for example. The server could also be a mail transfer agent. Also in step 602, the request may be a request to send a message from a client data processing system to a list of recipients. The process then retrieves header information associated with a set of incoming messages on the server (step 604). In step 604, the header information may be retrieved from the server and transferred to the client.

Thereafter, the process searches the header information to determine whether an incoming message in the set of incoming messages is related to the drafted message (step 606). If the process determines that the incoming message is related to the drafted message, the process indicates at the client that the incoming message is related to the drafted message (step 608), with the process terminating thereafter. In step 608, the process may display an indication on a user interface for the client data processing system.

Figure 7:
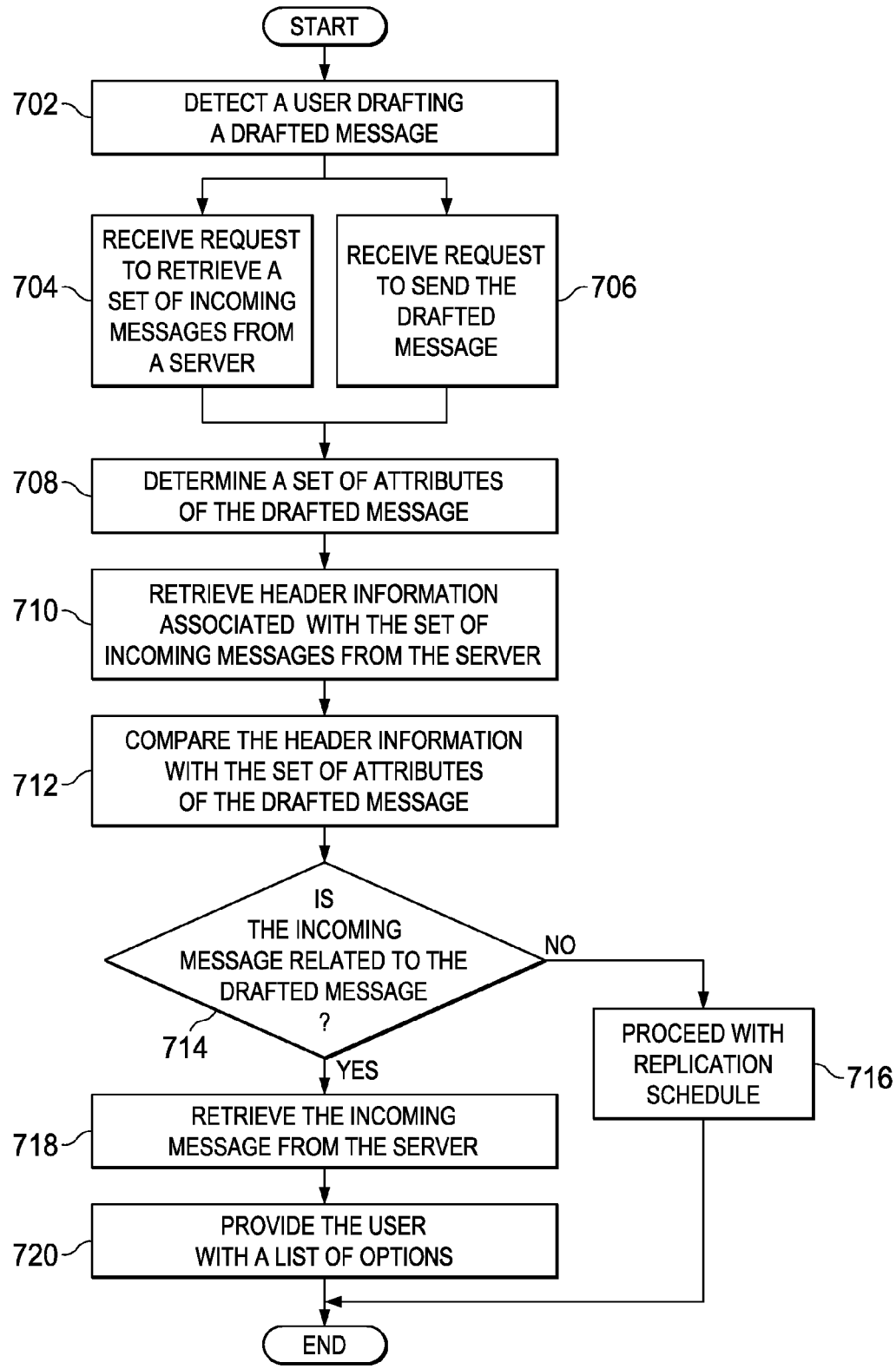
FIG. 7 is a flowchart of a process for managing requests to send and retrieve messages depicted in accordance with an illustrative embodiment.

With reference now to FIG. 7, a flowchart of a process for managing requests to send and retrieve messages is depicted in accordance with an illustrative embodiment. The process may be performed by message replication process 310 running on client data processing system 302 in FIG. 3.

The process begins by detecting a user drafting a drafted message (step 702). The process may then receive a request to retrieve a set of incoming messages from a server (step 704). Alternatively, the process may receive a request to send the drafted message (step 706). In response to either step 704 or step 706, the process then determines a set of attributes of the drafted message (step 708).

Thereafter, the process retrieves header information associated with the set of incoming messages from the server (step 710). The process then compares the header information with the set of attributes of the drafted message (step 712). Thereafter, the process determines whether an incoming message within the set of incoming messages is related to the drafted message (step 714). If the process determines that the incoming message is not related to the drafted message, the process proceeds with a replication schedule of the client (step 716) with the process terminating thereafter. In step 716, the process may send the message as requested. The process may also retrieve the set of incoming messages as requested.

If the process determines that the incoming message is related to the drafted message, the process retrieves the incoming message from the server (step 718). In step 718, the process may retrieve the incoming message before any other messages at the server. Thereafter, the process provides the user with a list of options (720) with the process terminating thereafter. In step 720, the process may also display an indication that the incoming message is related to the drafted message. The process may also display the incoming message on a user interface of the client data processing system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The different illustrative embodiments reduce inconsistencies in a series of related messages caused by time delay. Header information is retrieved and searched before messages are retrieved or sent. A user interface provides an indication of possibly related messages and a list of options before a message is sent or unrelated messages are retrieved. The user is enabled to view and consider related messages prior to sending a message or spending additional time drafting a message that may be irrelevant, redundant, and or based on outdated information. By searching header information and giving priority to retrieving related messages, the different illustrative embodiments reduce inconsistencies caused by lapse of time in message retrieval.

Thus, the different illustrative embodiments provide a method, a computer program product, and a computer system for managing requests to send messages. In an illustrative embodiment, header information associated with a set of incoming messages on a server data processing system is retrieved in response to receiving a request to send a drafted message from a client data processing system to the server data processing system. The header information is searched to determine whether an incoming message in the set of incoming messages is related to the drafted message. An indication that the incoming message is related to the drafted message is presented at the client data processing system in response to determining that the incoming message is related to the drafted message.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for managing a client computer, the method comprising the steps of:
   while a new email is being drafted by a user at the client computer:

the client computer receiving, from the user, a request to retrieve other emails that are stored on a server computer system and addressed to the user but not yet sent to the client computer;

in response to the request, the client computer receiving and searching header information of the other emails without the client computer receiving bodies of the other emails from the server computer;

the client computer determining, based on the header information, whether one or more of the other emails is related to the new email; and the client computer increasing a retrieval priority of one or more of the other emails that are related to the new email such that the client computer retrieves the one or more of the other emails that are related to the new email from the server computer before retrieving any other of the other emails from the server computer.

2. The method of claim 1 further comprising the steps of:
the client computer determining whether the one or more of the other messages is related to the new message by identifying, based on the header information, one or more of the other emails that are addressed to the user and to a predetermined plurality of other recipients and one or more of the other emails that are not addressed to the predetermined plurality of other recipients;

the client computer determining that the one or more of the other emails that are addressed to the user and to the predetermined plurality of other recipients are not related to the new email; and the client computer requesting the server computer to send to the client computer the one or more of the other emails that are not addressed to the predetermined plurality of other recipients before sending to the client computer the one or more of the other emails that are addressed to the user and the predetermined plurality of other recipients.

3. The method of claim 1, wherein the client computer determining whether the one or more of the other emails is related to the new email further comprises the steps of:
the client computer identifying a subject of the new email; and
for each one of the one or more of the other emails:
the client computer determining an amount of information in the subject of the new email that matches subject information in the header information of the one or more of the other emails; and
wherein the one or more of the other emails is related to the new email when the amount of information matches or exceeds the subject information in the header information of the one or more of the other emails.

4. The method of claim 1, wherein the client computer determining whether the one or more of the other emails is related to the new email further comprises the steps of:
the client computer identifying a list of particular recipients to which the new email is to be sent; and
for each one of the one or more of the other emails:
the client computer determining a quantity of the particular recipients that matches recipient information that is included in the header information of the one or more of the other emails, wherein the quantity is less than 100%; and
the client computer determining that the one or more of the other emails is related to the new email when the quantity meets or exceeds a threshold.

5. The method of claim 1, further comprising the step of:
responsive to determining that the one or more of the other emails is related to the new email, the client computer providing an indication that the one or more of the other emails is related to the new email by providing a list of options at the client computer, wherein the list of options includes a first option to send the new email without modification, a second option to modify the new email before sending the new email, and a third option to merge the new email with the one or more of the other emails that is related to the new email.

6. The method of claim 1, wherein the new email is a comment to be displayed on a website.

7. A computer program product for managing a client computer, the computer program product comprising:
one or more computer-readable storage devices, and program instructions stored on the one or more storage devices, the program instructions comprising:
while a new email is being drafted by a user at the client computer:
program instructions to receive, from the user, a request to retrieve other emails that are stored on a server computer system and addressed to the user but not yet sent to the client computer;
program instructions, responsive to the request, to receive and search header information of the other emails without the client computer receiving bodies of the other emails from the server computer;
program instructions to determine, based on the header information, whether one or more of the other emails is related to the new email; and
program instructions to increase a retrieval priority of one or more of the other emails that are related to the new email such that the client computer retrieves the one or more of the other emails that are related to the new email from the server computer before retrieving any other of the other emails from the server computer.

8. The computer program product of claim 7 further comprising:
program instructions to determine whether the one or more of the other messages is related to the new message by identifying, based on the header information, one or more of the other emails that are addressed to the user and to a predetermined plurality of other recipients and one or more of the other emails that are not addressed to the predetermined plurality of other recipients;
program instructions to determine that the one or more of the other emails that are addressed to the user and to the predetermined plurality of other recipients are not related to the new email; and
program instructions to request the server computer to send to the client computer the one or more of the other emails that are not addressed to the predetermined plurality of other recipients before sending to the client computer the one or more of the other emails that are addressed to the user and the predetermined plurality of other recipients.

9. The computer program product of claim 7, wherein the program instructions to determine whether the one or more of the other emails is related to the new email further comprises:
program instructions to identify a subject of the new email; and
for each one of the one or more of the other emails:
program instructions to determine an amount of information in the subject of the new email that matches subject information in the header information of the one or more of the other emails; and wherein the one or more of the other emails is related to the new email when the amount of information matches or exceeds the subject information in the header information of the one or more of the other emails.

10. The computer program product of claim 7, wherein the program instructions to determine whether the one or more of the other emails is related to the new email further comprises:
program instructions to identify a list of particular recipients to which the new email is to be sent; and
for each one of the one or more of the other emails:
program instructions to determine a quantity of the particular recipients that matches recipient information that is included in the header information of the one or more of the other emails, wherein the quantity is less than 100%; and
program instructions to determine that the one or more of the other emails is related to the new email when the quantity meets or exceeds a threshold.

11. The computer program product of claim 7, further comprising:
program instructions, responsive to determining that the one or more of the other emails is related to the new email, to provide an indication that the one or more of the other emails is related to the new email by providing a list of options at the client computer, wherein the list of options includes a first option to send the new email without modification, a second option to modify the new email before sending the new email, and a third option to merge the new email with the one or more of the other emails that is related to the new email.

12. The computer program product of claim 7, wherein the new email is a comment to be displayed on a website.

13. A computer system for managing a client computer, the computer system comprising:
one or more processors, one or more computer-readable memories and one or more computer-readable storage devices, and program instructions, stored on the one or more storage devices for execution by the one or more processors via the one or more memories, the program instructions comprising:
while a new email is being drafted by a user at the client computer:
program instructions to receive, from the user, a request to retrieve other emails that are stored on a server computer system and addressed to the user but not yet sent to the client computer;
program instructions, responsive to the request, to receive and search header information of the other emails without the client computer receiving bodies of the other emails from the server computer;
program instructions to determine, based on the header information, whether one or more of the other emails is related to the new email; and
program instructions to increase a retrieval priority of one or more of the other emails that are related to the new email such that the client computer retrieves the one or more of the other emails that are related to the new email from the server computer before retrieving any other of the other emails from the server computer.

14. The computer system of claim 13 further comprising:
program instructions to determine whether the one or more of the other messages is related to the new message by identifying, based on the header information, one or more of the other emails that are addressed to the user and to a predetermined plurality of other recipients and one or more of the other emails that are not addressed to the predetermined plurality of other recipients;
program instructions to determine that the one or more of the other emails that are addressed to the user and to the predetermined plurality of other recipients are not related to the new email; and
program instructions to request the server computer to send to the client computer the one or more of the other emails that are not addressed to the predetermined plurality of other recipients before sending to the client computer the one or more of the other emails that are addressed to the user and the predetermined plurality of other recipients.

15. The computer system of claim 13, wherein the program instructions to determine whether the one or more of the other emails is related to the new email further comprises:
program instructions to identify a subject of the new email; and
for each one of the one or more of the other emails:
program instructions to determine an amount of information in the subject of the new email that matches subject information in the header information of the one or more of the other emails; and
wherein the one or more of the other emails is related to the new email when the amount of information matches or exceeds the subject information in the header information of the one or more of the other emails.

16. The computer system of claim 13, wherein the program instructions to determine whether the one or more of the other emails is related to the new email further comprises:
program instructions to identify a list of particular recipients to which the new email is to be sent; and
for each one of the one or more of the other emails:
program instructions to determine a quantity of the particular recipients that matches recipient information that is included in the header information of the one or more of the other emails, wherein the quantity is less than 100%; and
program instructions to determine that the one or more of the other emails is related to the new email when the quantity meets or exceeds a threshold.

17. The computer system of claim 13, further comprising:
program instructions, responsive to determining that the one or more of the other emails is related to the new email, to provide an indication that the one or more of the other emails is related to the new email by providing a list of options at the client computer, wherein the list of options includes a first option to send the new email without modification, a second option to modify the new email before sending the new email, and a third option to merge the new email with the one or more of the other emails that is related to the new email.

18. The computer system of claim 13, wherein the new email is a comment to be displayed on a website.

* * * * *